(12) United States Patent
Matsuura

(10) Patent No.: US 6,430,743 B1
(45) Date of Patent: Aug. 6, 2002

(54) APPARATUS OF STORING URL TRANSMITTED VIA VERTICAL BLANKING INTERVAL OF TELEVISION SIGNAL

(75) Inventor: Katsuji Matsuura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/559,299

(22) Filed: Apr. 25, 2000

Related U.S. Application Data

(62) Division of application No. 08/855,699, filed on May 8, 1997, now Pat. No. 6,075,568.

(30) Foreign Application Priority Data

May 10, 1996 (JP) ............................................. 8-139777

(51) Int. Cl.⁷ ............................. H04N 7/10; H04N 7/00; H04N 11/00
(52) U.S. Cl. ....................... 725/112; 348/552; 348/553; 348/563; 348/465; 725/136; 725/110; 725/51; 725/43
(58) Field of Search ................................. 348/478, 552, 348/553, 563, 61, 465, 468, 473, 564, 345, 327, 555, 554; 725/40, 43, 48, 51, 52, 131, 136, 110, 112

(56) References Cited

U.S. PATENT DOCUMENTS

| 5,619,274 A | * | 4/1997 | Roop et al. ................. 348/461 |
|---|---|---|---|
| 5,734,835 A | * | 3/1998 | Selker .......................... 709/249 |
| 5,745,184 A | * | 4/1998 | Neal ............................ 348/468 |
| 5,745,909 A | * | 4/1998 | Perlman et al. .............. 707/513 |
| 5,748,255 A | * | 5/1998 | Johnson et al. .............. 348/553 |
| 5,761,602 A | * | 6/1998 | Wagner et al. ................. 725/34 |
| 5,774,666 A | * | 6/1998 | Portuesi ....................... 725/110 |
| 5,778,181 A | * | 7/1998 | Hidary et al. ................ 725/110 |
| 5,833,468 A | * | 11/1998 | Guy et al. ................... 434/350 |
| 5,844,552 A | * | 12/1998 | Gaughan et al. ............. 348/466 |
| 5,912,700 A | * | 6/1999 | Honey et al. ................ 348/157 |
| 6,061,719 A | * | 5/2000 | Bendinelli et al. ........... 709/218 |
| 6,075,568 A | * | 6/2000 | Matsuura ..................... 348/478 |
| 6,230,324 B1 | * | 5/2001 | Tomita et al. ................. 725/51 |
| 6,272,680 B1 | * | 8/2001 | Gaughan et al. ............. 348/565 |
| 6,310,661 B1 | * | 10/2001 | Arsenault .................... 348/569 |

* cited by examiner

*Primary Examiner*—John W. Miller
*Assistant Examiner*—Linus H. Lo
(74) *Attorney, Agent, or Firm*—Jay H. Maioli

(57) ABSTRACT

The network system has a configuration so that information supplier address data transmitted together with character broadcast data is extracted and stored in the Internet address memory. Furthermore, the Web site addresses once accessed by the user or selected on a character broadcast display can be registered in an address list as being stored in the address list area, and a desired Web site can be accessed by the Internet browser 9 according to an address selected from the address list.

6 Claims, 6 Drawing Sheets

APPARATUS OF STORING URL TRANSMITTED VIA VERTICAL BLANKING INTERVAL OF TELEVISION SIGNAL

This application is a division of application Ser. No. 08/855,699 filed May 8, 1997. now U.S. Pat. No. 6,075,568

BACKGROUND OF THE INVENTION

The present invention relates to a data broadcast receiver and a network system associated with a network such as Internet, etc.

In recent years, Internet has been widely known as a A world-wide network. The network of the Internet is formed so that each terminal is connected to another via, for example, a telephone line or a privately leased high speed data line and data is sent/received in the worldwide scale.

Such Internet is now used not only for sending/receiving business and personal electronic mail, but also for accessing home pages of many information suppliers via generally so-called Web sites to read various types of information. Such a Web site accessing is called net-surfing.

For such use of Internet, an easier accessing environment is now available for both business and personal users of computer hardware including personal computers and is rapidly coming into wide use.

To use Internet as mentioned above, the user must install a software program for accessing Web sites, which is generally called a browser, in the computer and read necessary information from Web sites using the browser.

When the user accesses a desired Web site supplied on Internet, for example, the user starts up a processing by the above browser software and makes displays for the accessing on the monitor screen. Then, the user inputs the address (URL: Uniform Resource Locator) of the desired home page on which the desired Web site is provided by using the keyboard to display the home page on the monitor screen. When the specified home page is accessed successfully, the accessed Web site home page image appears on the monitor screen. Then, the user can jump from the home page to search the Web site for desired information.

To access a desired Web site via Internet in such way, it is indispensable for the user to input the address, but the user must know the address of the Web site beforehand in this case. Thus, most of Internet users have to buy an information book containing much Web site information and many Web site. addresses or they must search for Web site information personally by any other means.

Since a Web site address is a combination of symbols, alphabets, numerals, and the like, it is usually inputted from a keyboard. However, since such an address comprises a few tens of digits, input operation of address is rather troublesome, often resulting in inputting wrong address. This prevents Internet users from easily accessing desired Web sites.

To avoid such trouble, a service has begun; at first the user inputs a key word as a retrieval item, then the user is supplied with the Web site address retrieved according to this key word. This service, however, is provided only in English language block now and will not be familiar to users in other language blocks.

Furthermore, browser software is provided with a function called "book mark". For example, if a user who is accessing a Web site may read the same Web site again later and wants to store the address, the user can use this "book mark" function to register the Web site address data in the book mark list. Consequently, the user can omit the address entry from a keyboard next time and just call the address from the book mark list. Even in this case, however, when accessing a target Web site for the first time, the user must input the address from the keyboard. Thus, this method cannot omit the use of keyboard completely.

In other words, using of Internet is always accompanied by comparatively troublesome works such as getting of addresses, address entries, and the like.

SUMMARY OF THE INVENTION

Accordingly, it is an object of the present invention to provide a broadcast receiver and a method of accessing a computer network which assure that Internet users are able to enjoy net-surfing more easily by eliminating above-mentioned problems.

This object is accomplished by a broadcast receiver for receiving broadcast signals in which a data signal is transmitted together with a video signal, comprising: receiving means for receiving the broadcast signals; separating means for separating data signal from the broadcast signals received by the receiving means; judging means for judging whether the data signal separated by the separating means is information associated with a computer network or not; and storing means for storing the separated data signal when the separated data signal is judged to be information associated with the computer network.

According to the above configuration, address information can be selected from the received data signal transmitted together with the video signal so that the address information can be stored. Thus, address searching becomes unnecessary.

Furthermore, the object of the present invention is accomplished by a method of accessing a computer network comprising the steps of: receiving broadcast signals in which a data signal is transmitted together with a video signal; separating the data signal from the received broadcast signals; judging whether the separated data signal is information associated with the computer network or not; storing the separated data signal when the separated data signal is judged to be information associated with the computer network; and accessing the computer network according to the stored information associated with the computer network.

According to the above accessing method, an address list can be created using stored address information, so that an operation for inputting address using a keyboard can be omitted together with an associated advantage of eliminating address input errors.

DETAILED DESCRIPTION OF THE PREFERRED EMBODIMENTS

Subsequently, an embodiment of this invention will be described. The network system in the embodiment of the present invention uses address information of Internet Web sites (information suppliers) superposed in the broadcast waves transmitted in a character broadcast transmission format.

A character broadcast is considered to be one of so-called data broadcasts. It is a broadcast transmitting character data as data for a data broadcast independently of ordinary TV video signals with the character data being superposed on a TV video signals. Such character data is transmitted using the selected horizontal scanning period in a vertical blanking period of video signals. The transmitter transmits Web site address data as such character data. Web site address data transmitted in such way may be transmitted separately from ordinary character broadcasts, but it will be explained here assuming that the network system in this embodiment receives broadcast waves comprising, for example, ordinary character broadcast data and Web site address data having something to do with this character broadcast data.

The above broadcast waves may also be any broadcast waves including ground waves, satellite broadcast waves, etc. They may also be transmitted by wire broadcasting such as CATV, etc. accordingly.

In order to correspond to the above broadcast system, the network system in this embodiment is provided with a character broadcast receiver for receiving a broadcast for which character data is superposed on video signals. At first, a general configuration of this character broadcast receiver will be explained below with reference to the block diagram shown in FIG. 1.

Figure 1:
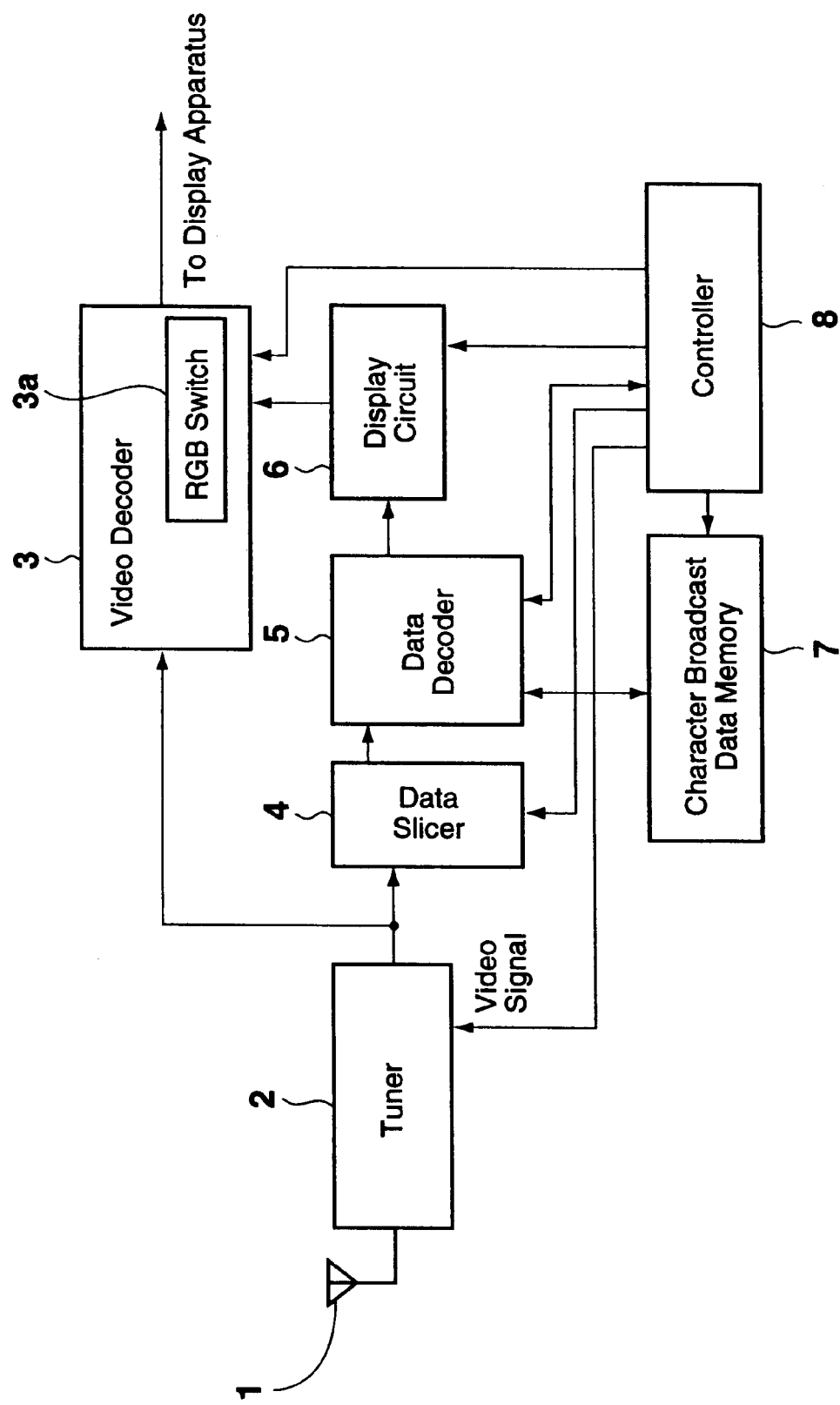
FIG. 1 is a block diagram showing a configuration of the character broadcast receiver provided in a network system in an embodiment of the present invention.

In FIG. 1, the object channel of the television broadcast waves received by an antenna 1 is selected by a tuner 2, then required processings such as amplifying, frequency conversion, wave detection, etc. are executed for the selected channel broadcast signals so that they are output as video signals. Voice signal processings are not illustrated in this FIG. 1. The video signals output from the tuner 2 are supplied to a video decoder 3 and a data slicer 4.

In the video decoder 3, required decoding and other processings are executed for the supplied signals to convert them into RGB signals, which are then supplied to a display apparatus (not illustrated here) via an internal RGB switch 3a. In this case, the display apparatus displays ordinary television broadcast video images of the channel selected by the tuner 2.

The data slicer 4 extracts character broadcast data (including address data in this embodiment) superposed in the section corresponding to the selected horizontal scanning period in a vertical blanking period of supplied video signals to supply them to the data decoder 5.

The data decoder 5 decodes supplied character broadcast data as specified.

In a character broadcast, each program comprises character data in pages. Thus, the data decoder 5 gets character data in pages from a program of character broadcast data after decoding processing. Character data obtained in such way is written and stored in a character broadcast data memory 7. The memory 7 is provided with a larger capacity to be able to store data of as many pages as possible. A controller 8 controls writing of such character broadcast data into the memory 7.

When displaying character broadcast data stored in the memory 7, the controller 8 controls reading out of the data so that each necessary page of character data of the object program can be read out from the memory 7 at the specified timing. Read out character broadcast data is supplied to a display circuit 6 via the data decoder 5.

The display circuit 6 converts supplied character data to RGB signals page by page and supplies them to the video decoder 3. The RGB signals of the character broadcast RGB signals supplied to the video decoder 3 are then processed as needed and supplied to the internal RGB switch 3a. When displaying the character broadcast data, the RGB switch is switched to select the RGB signals supplied from the display circuit 6 and output them. The selected character broadcast images are displayed on the display apparatus screen page by page.

Figure 2:
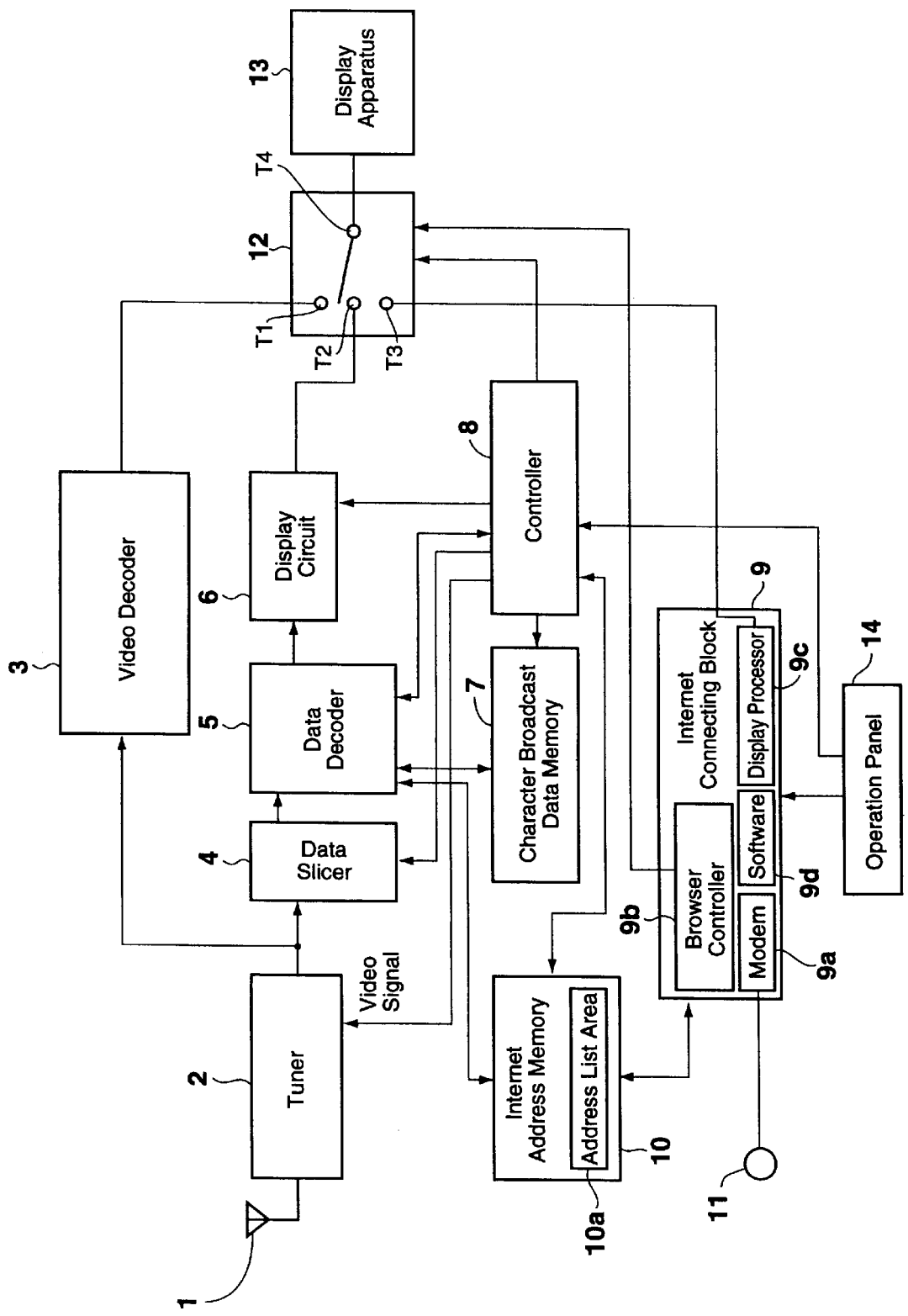
FIG. 2 is a block diagram showing a configuration of the network system in an embodiment of the present invention. FIG.

FIG. 2 is a block diagram showing a configuration of the network system in this embodiment, wherein the network system is provided with a character broadcast receiver shown in FIG. 1. This network system is integrated with a display apparatus such as a CRT (Cathode Ray Tube), and the like. The network system is further provided with necessary devices to function as an apparatus applicable to multimedia which is able to cope with, at least, ordinary television broadcasts and character broadcasts in addition to Internet browser functions. In FIG. 2, the same items as those shown in FIG. 1 are designated by the same numerals with explanation thereof being omitted. Illustration of the voice signal circuits is omitted here, as well.

In FIG. 2, the Internet connecting block 9 comprises such hardware as a microcomputer comprising a modem 9a, a browser controller 9b, and a display processor 9c, as well as Internet communication software 9d, which are all necessary for using the Internet. Thus, the Internet connecting block 9 is provided with at least enough functions to access Internet Web sites. The Internet connecting block 9 is connected to the Internet communication network via a telephone line 11, by which the user is able to access desired Internet Web sites. The browser controller 9b provided in the Internet connecting block 9 is exclusively used for Internet functions and controls operations of the Internet connecting block 9.

The Internet address memory 10 stores Internet address data and its associated information extracted and decoded from received video signals by the data decoder 5 (to be described later). This Internet address memory 10 is provided with an address list area 10a used for storing Web site address data selected by the user (to be described later). Only this address list area 10a in the Internet address memory 10 may use, for example, a non-volatile memory such as EEPROM, flash memory, and the like so that the data in the area is not lost even when the system is turned off. Other areas in the Internet address memory 10 correspond to data stored in the character broadcast data memory 7 and the data in those areas is erased when the system is turned off.

The Internet address memory 10 can use a bi-directional type bus line for high speed processings. Consequently, the controller 8 and the browser controller 9b can access the Internet address memory 10 in the time-division manner for writing/reading in/from the memory 10, so both controllers 8 and 9b can operate independently of each other.

The modem 9a of the Internet connecting block 9 accesses a target Internet Web site via a telephone line 11.

And, according to the obtained Web site information, the display processor 9c supplies the display image of the Web site to the terminal T3 of the RGB switch 12 as RGB signals. The display circuit 6 may be used as the display processor 9c.

The RGB switch 12 is used to switch RGB signals so that the terminal T4 can be connected to any of terminals T1, T2, and T3 selectively. In this case, the RGB signal outputs of the video decoder 3, the display circuit 6, and the Internet connecting block 9 are connected to terminals T1, T2, and T3 respectively. Signals from the terminal T4 are entered to the display apparatus 13. In the network system in this embodiment, therefore, one of the television broadcast video signals from the video decoder 3, the character broadcast video signals from the display circuit 6, and the Internet information video signals from the Internet connecting block 9 can be selected and displayed on the display apparatus 13.

The operation panel 14 is provided to operate the network system in this embodiment. The operation information signals from this operation panel 14 are supplied to the controller 8 and the browser controller 9b in the Internet connecting block 9. Consequently, for example, the user operates the operation panel 14 to execute ordinary television functions, character broadcast functions, and Internet functions in the network system of this embodiment. The user can also select any of those functions from the operation panel 14.

The operation panel 14 may be provided in a device body and the panel configuration may also include a remote controller, a receiver, etc.

Subsequently, how the network system in this embodiment fetches Internet address information from broadcast waves and how the network system accesses Internet according to fetched address information will be described.

As described above, the Internet browsing system in this embodiment broadcasts so that Web site address data associated with, for example, a character broadcast program is superposed on video signals together with character broadcast data.

The network system in this embodiment shown in FIG. 2 receives such video signals and character broadcast program data is extracted from the video signals and stored in the character broadcast data memory 7. In this embodiment, Web site address data is also extracted together with character broadcast data. This Web site address data is stored in the Internet address memory 10 under the control of the controller 8.

For example, Internet Web site address data begins, as well known, with a character string of "http:// . . . ". Thus, the controller 8 refers to character data decoded and output from the data decoder 5 sequentially. If the character string code matches with "http:// ", the controller 8 judges it as a Web site address and can instruct the Internet address memory 10 to store the address data.

When Web site address data is stored in the Internet address memory 10, the address data is stored corresponding to program and page information indicating character broadcast program and page positions on which object Web site address data is superposed. The character broadcast program information and page information can be obtained according to program information and page information included in the header of the character broadcast transmitted together with character data.

In the network system in this embodiment, the character broadcast receiver extracts character broadcast data and Web site address data from video signals in such way that data are respectively stored in the character broadcast data memory 7 and the Internet address memory 10.

When displaying character broadcast data using such a network system, for example, the user can operate the operation panel 14 to select character broadcast functions and specify the user desired program and page. According to this specification, the controller 8 connects the RGB switch to the terminal T2 to read the character data of the specified program and page from the character broadcast data memory 7 and supplies the data to the display circuit 6. At this time, the controller 8 refers to the data stored in the Internet address memory 10. If there is the Web site address data corresponding to the specified program or page in the memory 10, the controller 8 reads out the data and supplies it to the display circuit 6 via the data decoder 5.

The display circuit 6 generates RGB signals according to the character broadcast data and the Web site address data and supplies the signals to the display apparatus 13 via the RGB switch 12.

Figure 3:
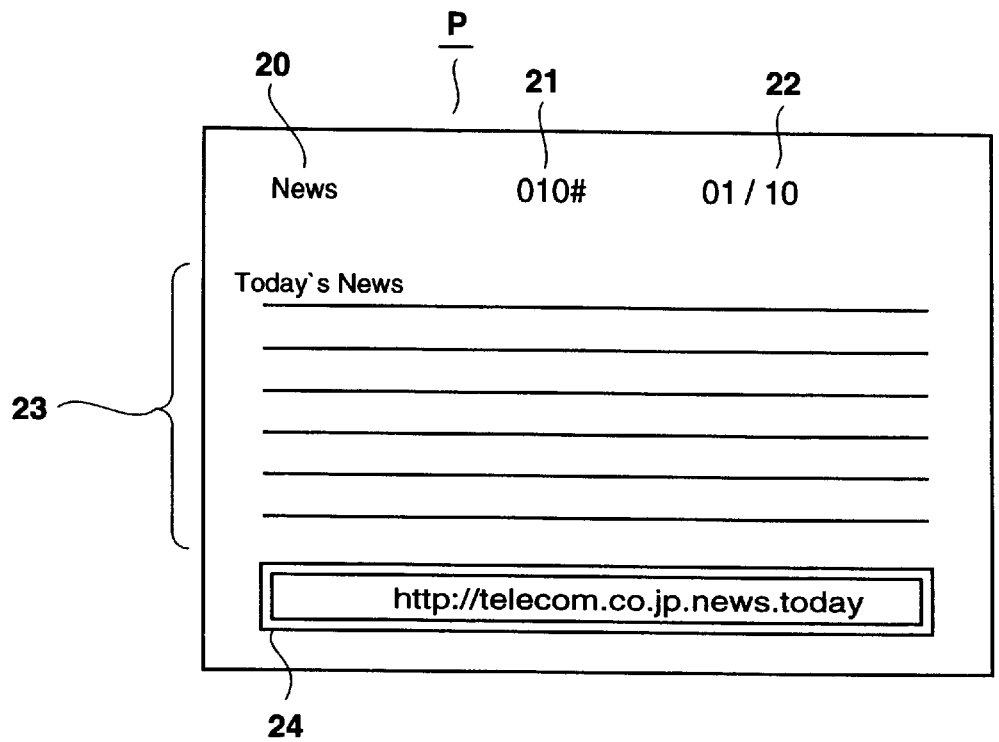
FIG. 3 is a view illustrating an example of a character broadcast display.

FIG. 3 shows an example of a picture of character broadcast program displayed on the display apparatus 13 according to the above operation.

For example, in the picture P shown in this FIG. 3, are displayed on the top of the picture a program title 20 displayed as "News", a program number 21 displayed as "010#", and a page number 22 displayed as "01/10", which indicates the page position relative to all pages of the program. Under those items is displayed specific contents (program contents 23) as "Today's News". Each of the program number 20, the program number 21, the page number 22, and the program contents 23 is displayed according to the data read from the character broadcast data memory 7.

And, in this case, at the bottom of the picture is displayed the current program or the current page associated Web site address (Internet address data 24) as http://telemo.co.jp.news.today; This Internet address data 24 is displayed according to the data read from the Internet address memory 10.

While the picture P is displayed as shown in FIG. 3, if the user wants to register the Web site displayed as the Internet address data 24 for the present for later use, the user can register the address from the operation panel by carrying out prescribed operation.

According to such an operation of the user, the controller 8 controls so that the Web site address data displayed as Internet address data 24 is stored also in the address list area 10a provided in the Internet address memory 10a. In this case, the corresponding character broadcast program information and page information are stored together with the Web site address data.

In other words, when the user watching the character broadcast is interested in other Web sites whose addresses are displayed on the picture together with the currently displayed character broadcast, the user is able to go on registering the Web site addresses in the address list area 10a as the user's own "address list" while watching the character broadcast.

The user can also delete any addresses from the address list from the operation panel 14.

While the picture P is displayed as shown in FIG. 3, the user can change the display to the Internet browser display to be able to directly access any Web site displayed as Internet address data 24.

In this case, when the user carries out a prescribed operation to access an address displayed as Internet address data 24 in the display of the character broadcast shown in FIG. 3, the browser controller 9b performs a control to switch the display to the Internet browser display (connects the RGB switch to T3). As a result, the browser software automatically enters the selected Web site address displayed as Internet address data 24.

According to the Web site address entered in such way, the Internet connecting block 9 accesses the specified Web site via the telephone line 11 from the modem 9a to fetch the information. Then, the display processor 9c generates RGB signals according to the fetched Web site information and outputs the signals to the display apparatus 13 via the RGB switch 12. Thus, the accessed Web site page can be displayed.

In this embodiment, the accessed Web site has a structure in which the address data is registered automatically in the address list area 10a, since the user is expected to access the site again with interest.

Figure 4:
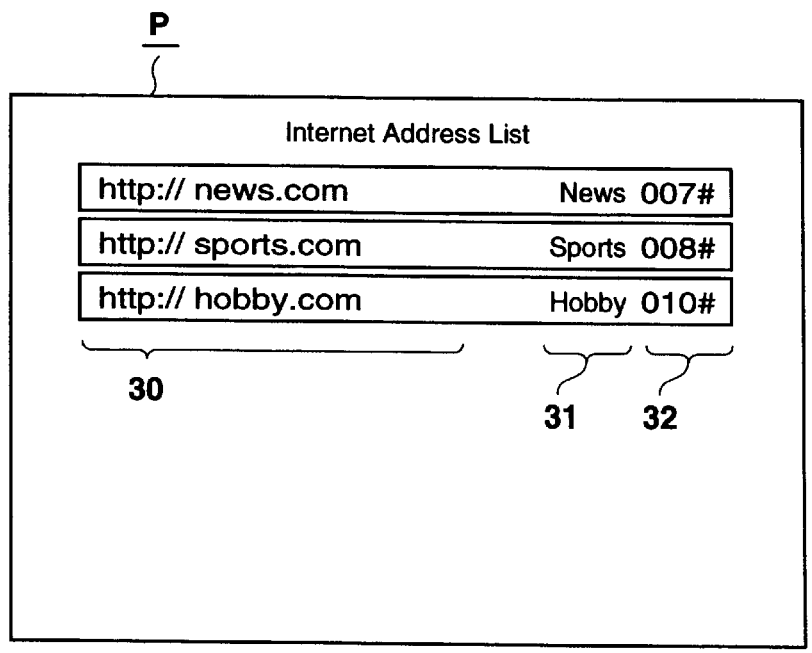
FIG. 4 is a view illustrating an example of an address list display.

When the user wants to see the current address list, the user can display the address list as shown in FIG. 4 by following the prescribed operation at the operation panel 14. In the picture P shown in this FIG. 4 are displayed three Web site addresses (address data 30) under the title displayed as "Internet Address List" with each of those addresses being displayed together with the corresponding character broadcast program name 31, the program number 32, etc.

When an address list is displayed as shown in FIG. 4, the controller 8 reads out the Web site addresses stored in the address list area 10a provided in the Internet address memory 10 together with associated character broadcast information and supplies the read out data to the data decoder 5, from which the data is supplied to the display circuit 6. In this display circuit 6, the address list video signals are generated, then supplied to the display apparatus 13 as RGB signals via the RBG switch 12.

In the above explanation, the display is changed from that of the character broadcast shown in FIG. 3 to that of the Internet address list shown in FIG. 4, and then the controller 8 controls so that the data is read out from the address list area 10a and displayed. However, the Internet address list shown in FIG. 4 can also be displayed through the change from the Internet browser display. In this case, the data is read out from the address list area 10a under the control of the browser controller 9b. according to the software programming stored in the Internet connecting block 9 and the address list data is supplied to the display processor 9c. The display processor 9c generates RGB signals for displaying the address list according to the supplied address list data and supplies the signals to the terminal T3 of the RGB switch 12. Then, the RGB signals are supplied to the display apparatus 13 via the RGB switch 12, so that the Internet address list is displayed.

The screen display formats shown in FIG. 3 and FIG. 4 are no more than examples. There may be many other screen display formats. For example, information of a title, etc. associated with Web site addresses may also be transmitted as broadcast waves so that the user can use the information appropriately related to the actual conditions for use. Such information can be included in the data displayed on the picture P shown in FIG. 3 and FIG. 4.

If the user specifies a desired Web site address selected from the displayed address list from the operation panel 14 while the address list is displayed as shown in FIG. 4, then the display is changed from the address list to the Internet browser display on the display apparatus 13. Then, the Web site address specified for the browser software is entered automatically. After this, the Internet connecting block 9 accesses this Web site and displays the accessed Web site display on the display apparatus 13.

As understood from the above explanation, in the Internet browser system provided with the network system of this embodiment, the user can get Internet Web site address information by receiving a television character broadcast. Since the character broadcast includes many types of programs such as news, and various entertainment programs, the Web site addresses supplied together with those program contents can also be obtained over various categories accordingly. Thus, the user can get so much Web site information even without specially buying any information magazines.

Web site address data supplied in such way is fetched as an address list, and any Web site address can be selected and specified from this address list so that the desired Web site can be accessed. Consequently, the user can be freed completely from troublesome and easy-to-confuse operations such as keyboard entries of address character strings that are carried out at personal computers. Of course, a system configuration may also be decided so that the user can enter address character strings as needed from the operation panel 14.

Following the above, processings executed by the controller 8 or the browser controller 9b to operate the network system in this embodiment as explained above will be described with reference to the flow charts shown in FIG. 5 through FIG. 7.

Figure 5:
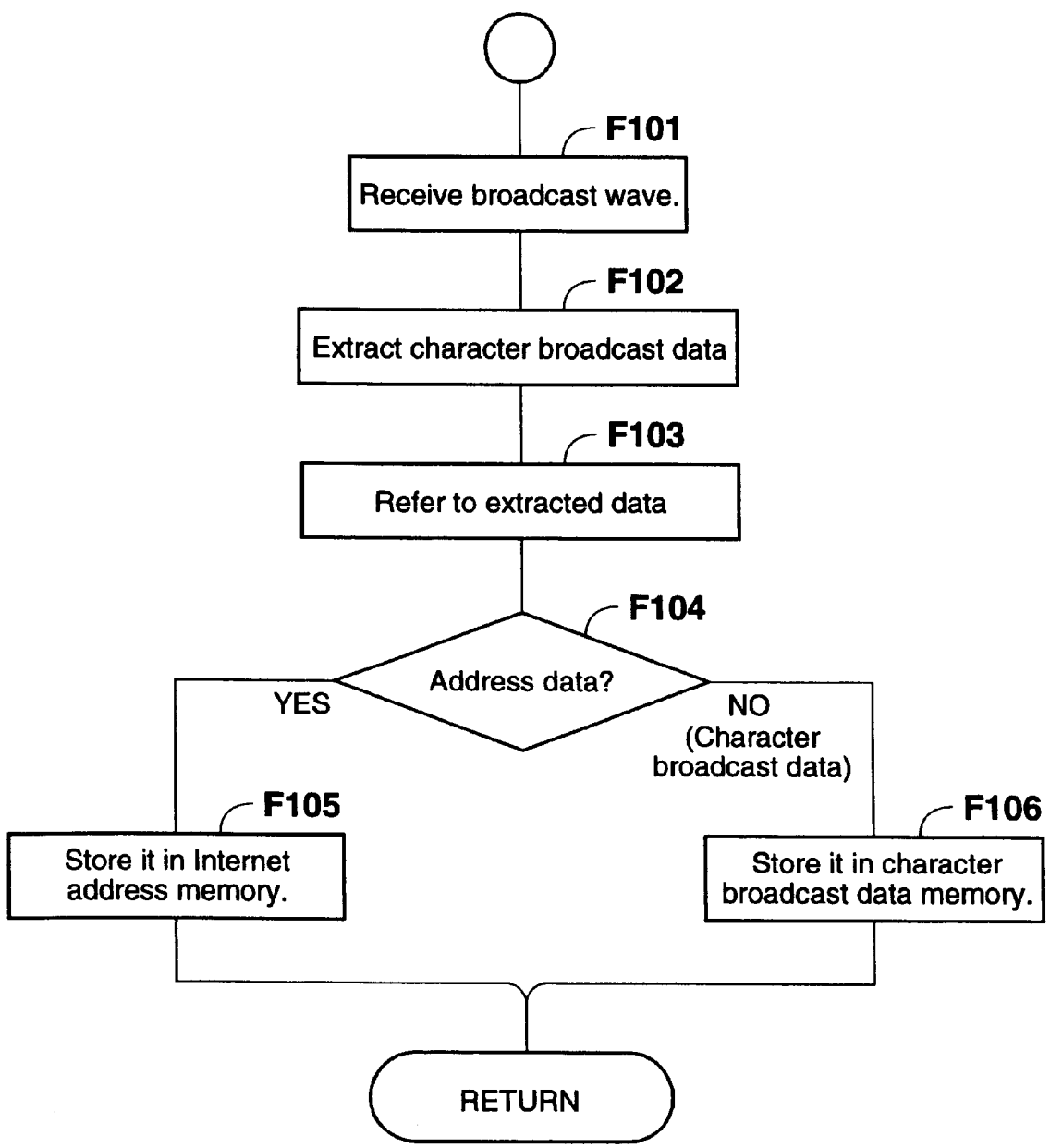
FIG. 5 is a flow chart showing a processing in which a data signal of the character broadcast and Web site address information are extracted from a broadcast video signal and stored.

FIG. 5 explains a processing of the network system in this embodiment to extract and fetch character broadcast data and Internet address data from received broadcast waves. The character broadcast receiver side controller 8 executes this processing.

In this routine, the controller 8 controls the tuner 2 in step F101 to select the target channel. In step F102, the controller 8 extracts character broadcast data from received channel video signals and fetches the signals via the data decoder 5 as explained in FIG. 2. At this time, the data before being decoded in the data decoder 5 may also be stored in the character broadcast data memory so as to reduce the character broadcast data memory capacity.

In step F103, the controller 8 refers to the extracted data obtained in the data decoder 5 to judge in the next step F104 whether the data referred to is Web site address data or ordinary character broadcast data. In this judgment, it is only needed to judge whether the extracted data character string code is "http://" as shown in FIG. 4 or not.

If judged to be Web site address data in step F104, the routine goes to step F105 to store the Web site address data in the Internet address memory 10 together with associated program and page information, and then returns to the previous routine.

If judged not to be Web site address data in step F104, that is, if judged to be ordinary character broadcast data, the routine goes to step F106 to store the character broadcast data in the character broadcast data memory 7.

By repeating such processings, character broadcast data and Web site address data can be extracted from received video signals and stored in memory.

Next, how the controller 8 registers Web site address data in an address list when a character broadcast is displayed will be explained with reference to FIG. 6.

In this routine a control operation is carried out in step F201 so that the character broadcast page of the user specified program is displayed. In the next step F202, the routine judges whether the Web site address displayed as Internet address data 24 is registered or not as explained in FIG. 3. If the address is not registered, the routine goes to step F204 to judge whether the address of the Web site displayed as the Internet addess data 24 is accessed or not. If judged not accessed in the step, the flow is returned to the previous routine and comes to this routine again to execute the processing in step F201 and waits for the operation of address registration and accessing the displayed Web site.

On the contrary, if judged that the displayed Web site is accessed, this routine reads out the Web site address data displayed currently as Internet address data 24 from the area of the Internet address memory 10 and writes the address data in the address list area 10a provided in the Internet address memory 10. Consequently, the address data of the Internet address data 24 is registered in the address list automatically as explained in FIG. 3. When the processing in this step F205 is executed, the routine goes to the processing in step F303 in FIG. 7 (to be explained later) to access the selected Web site.

If judged that a Web site address is registered in step F202, the routine goes to step F203 to read the Web site address data displayed currently as Internet address data 24 from the area of the Internet address memory 10 and writes the address data in the address list area 10a provided in the Internet address memory 10. Consequently, the Web site address is registered according to the user operation.

Figure 7:
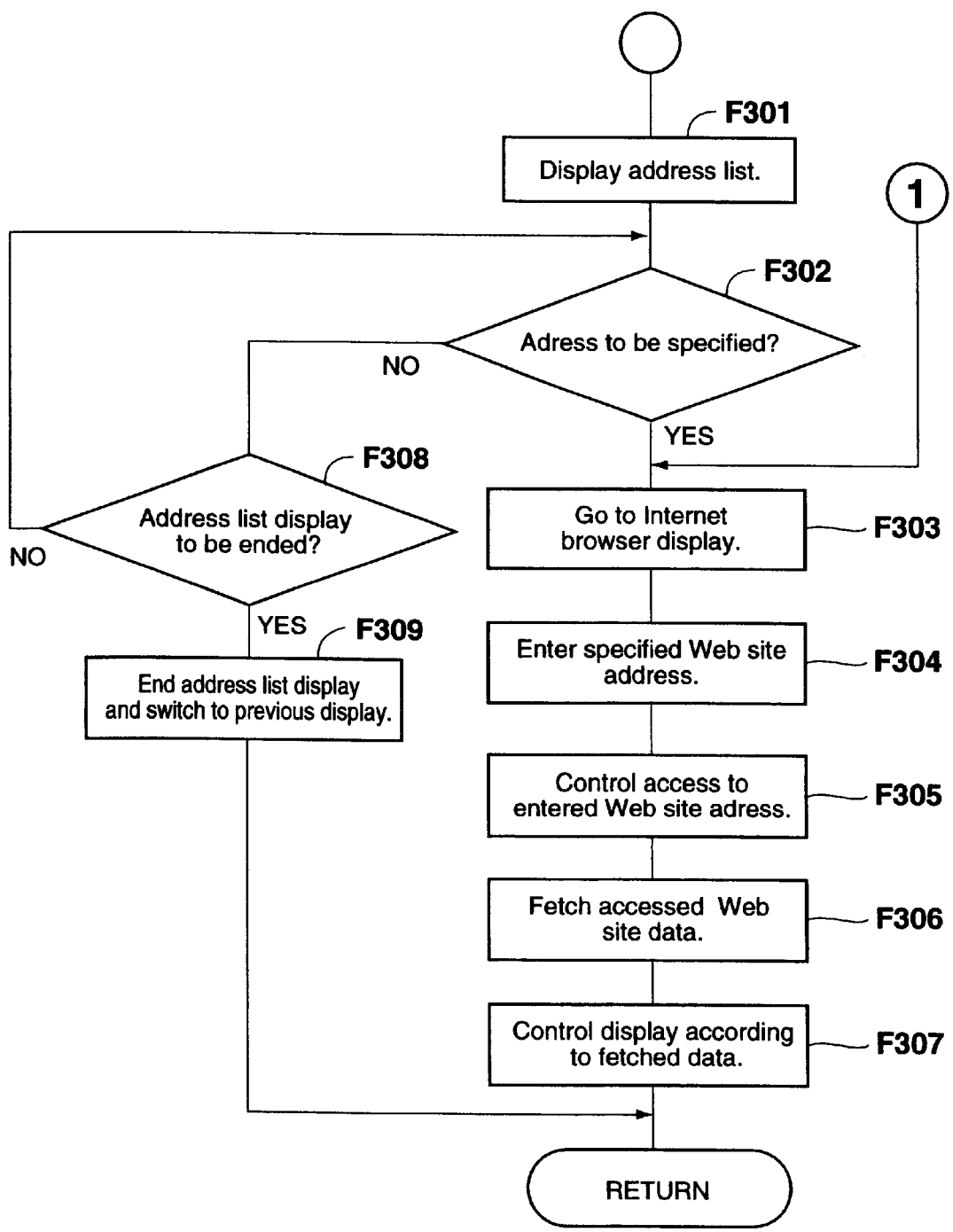
FIG. 7 is a flow chart showing a processing to access a Web site registered in an address list.

FIG. 7 shows how a Web site is accessed according to the address selected by the user from the displayed address list shown in FIG. 4.

The processings in steps F301, F302, F308, and F309 shown in FIG. 7, are executed by the controller 8 when, for example, the display is shifted from character broadcast display to address list display, and by the browser controller 9b when the display is shifted from Internet browser display to address list display. The browser controller 9b also executes the processings in steps F303 through F307 according to the browser software program. Here, however, those processings executed by the controller 8 and the browser controller 9b are united into one processing routine for convenience.

At first, a processing for displaying an address list as shown in FIG. 4 is executed in step F301. In the next step F302, whether address specification is carried out or not is judged. If judged that no address specification is made here as has been explained with reference to FIG. 4, the routine goes to step F308 to judge whether the address list display is ended or not.

In step F308, if judged that no processing for ending address list display is executed, the routine goes back to step F302 to wait for an address specification processing. On the other hand, if judged that an operation for ending address display is done, the routine goes to step F309 to end the address display and change the display to the previous display. Then, the flow is returned to the previous routine. In other words, the address list display is shifted to an ordinary television broadcast display, a character broadcast display, or an Internet browser display according to the display previous to the address list display.

If judged that an address specification is carried out in step F302, the routine goes to step F303 to carry out control to change the display to the Internet browser display. As mentioned above, the browser controller 9b executes the processings in steps F303 through F307. If the controller 8 executed any processing before F303 through F307 (in other words, the mode was for displaying character broadcast or ordinary television broadcast data), the browser controller 9b takes over the processings in and after step F303.

Figure 6:
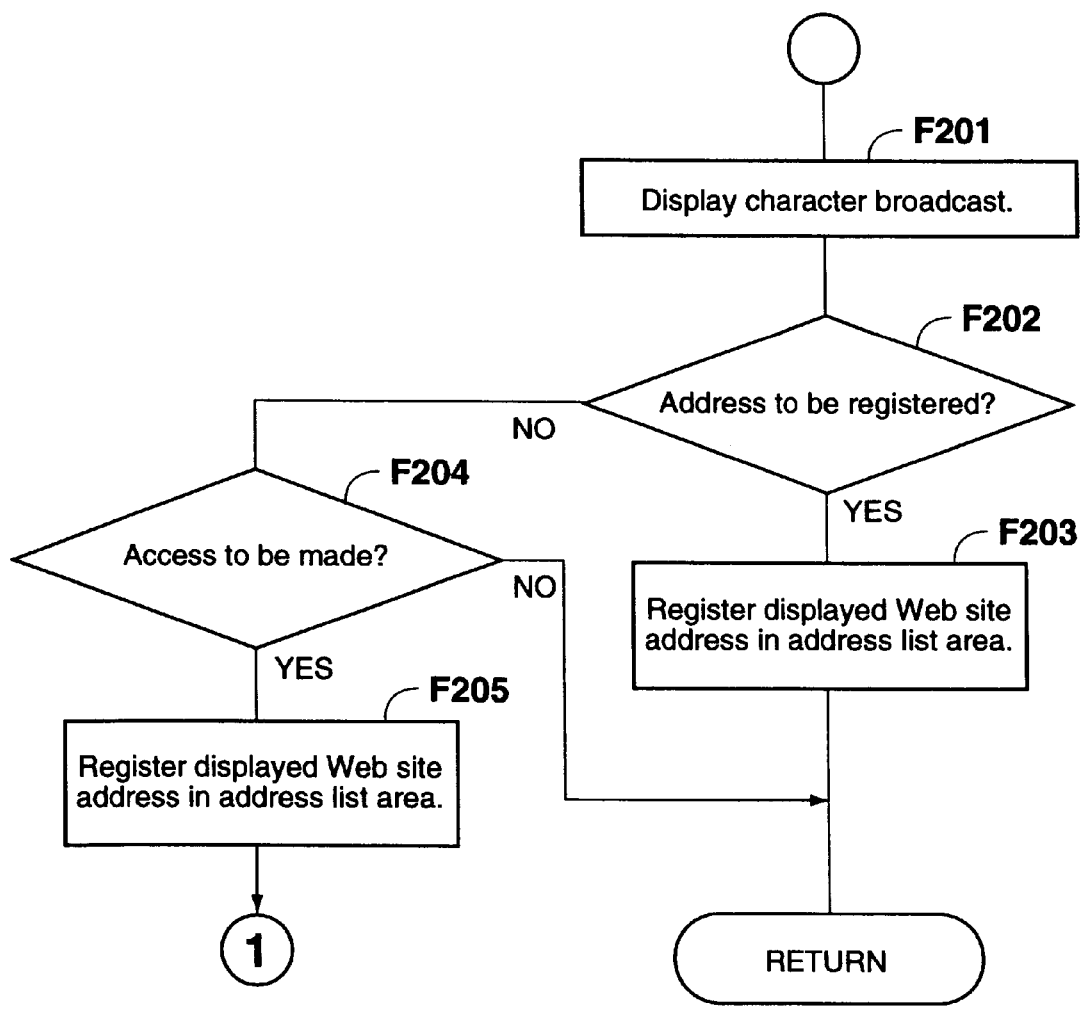
FIG. 6 is a flow chart showing a processing to register Web site address data displayed on a character broadcast display into an address list.

Furthermore, the processings in and after step F303 are continued from step F205 in the flow chart shown in FIG. 6 as explained above.

In the next step F304, the address specified in step F302 is entered automatically as the Web site address to be accessed by the browser software. According to this entered address, a control is carried out to access the Web site of the address to be entered in the next step F305.

After this, accessed Web site data is fetched into the Internet connecting block 9 in step F306 and the routine carries out a control so that data is displayed on the display apparatus 13 according to the fetched Web site data in step F307.

The present invention is not limited only to the configurations in the embodiment explained above. Each configuration may also be changed according to actual service conditions, etc. For example, on the character broadcast display shown in FIG. 3, the address newly displayed as the Internet address data 24 each time a program or page is changed may be fetched automatically as possible Web sites be accessed again by the user.

Furthermore, a character string "http:// " is used in the above description to distinguish Web site address data from ordinary character broadcast data. However, the Web site address data can be also identified by using, for example, a specified header with which each Web site address is to be transmitted from the transmitting side.

Furthermore, in the above description, an address is transmitted which has detailed information of a character broadcast program independently of television broadcasts. However, an address of a Web site having detailed information of a television broadcast program or commercial message may be transmitted instead of the above Web site address.

Although the network system in this embodiment is explained to have a configuration enabling "net-surfing", the network system is not limited only to this and may also be provided with functions for using other Internet operations such as those for sending/receiving electronic mail via Internet.

In the above embodiment, the character broadcast receiver is provided with Internet connecting functions. However, the receiver may be provided only with an Internet address memory 10 so that Web site address data is transmitted to the user's personal computer via an external bus under the control of the controller 8. The personal computer automatically accepts Web site address data transmitted via the external bus as a Web site address to be accessed by the browser software. Consequently, no keyboard is needed to enter Web site addresses.

Moreover, the network system in this embodiment is not limited only to the configuration shown in FIG. 1. The network system may also be provided with, for example, functions for reproducing data from such disk media as CD-ROM and/or with a hard disk drive to be formed as a system applicable to multiple media enabling data to be recorded/reproduced in/from large capacity recording media such as a hard disk, etc.

As explained above, the broadcast receiver according to the present invention is made to extract network supplier addresses included in character broadcast data and store the addresses in memory independently of the character broadcast data, so that addresses of many information suppliers associated with character broadcast contents can be obtained only by receiving the broadcast waves.

Furthermore, since the system enables access to a specified information supplier on the desired network only by carrying out the specified operation indicating the access to the address displayed as character broadcast data or listed in an address list, the user is freed from being nervous to enter address character strings correctly from a keyboard, etc. Thus, the present invention can have the effect facilitating use of networks.

What is claimed is:

1. A broadcast receiver for receiving broadcast signals in which address information associated with a computer network is transmitted together with a video signal, comprising:

receiving means for receiving said broadcast signals;

a video decoder for decoding said video signal received by said receiving means;

separating means for separating said address information associated with said computer network from said broadcast signals;

storing means for storing said separated address information;

list making means for making a list of said separated address information stored in said storing means;

a user operated control panel;

a selector for selecting as an output one of a decoded signal from said video decoder, said list of said separated address information from said list making means, or an Internet Web page in response to a selection command by a user of said user operated control panel; and display processing means for displaying said output of said selector based on said selection command by said user.

2. The broadcast receiver according to claim 1, further comprising Internet connecting means for fetching said Internet Web page including:

a browser controller; and an Internet communication software package.

3. The broadcast receiver according to claim 2, wherein said Internet connecting means further includes a modem.

4. The broadcast receiver according to claim 1, wherein said storing means is formed of flash memory.

5. A method of accessing a computer network comprising the steps of:

receiving broadcast signals in which address information associated with said computer network is transmitted along with a video signal;

decoding said video signal;

separating said address information associated with said computer network from said broadcast signals;

storing said separated address information;

making a list of said separated address information;

selecting one of a decoded signal decoded in said step of decoding, said list of said separated address information formed in said step of making a list, or an Internet Web page in response to a selection command by a user.

6. The method of accessing a computer network according to claim 5, further comprising:

displaying said list of said separated address information;

selecting a desired address from said list;

accessing said computer network according to said desired address; and retrieving said Internet WEB page corresponding to said desired address.

* * * * *